(12) United States Patent
Lee et al.

(10) Patent No.: US 7,567,797 B1
(45) Date of Patent: Jul. 28, 2009

(54) DATA APPLICATION-TRIGGERED CALL VOLUME MANAGEMENT

(75) Inventors: Chinmei Chen Lee, Woodbridge, IL (US); Douglas William Varney, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 09/565,661

(22) Filed: May 5, 2000

Related U.S. Application Data

(60) Provisional application No. 60/163,553, filed on Nov. 4, 1999.

(51) Int. Cl.
*H04L 12/24* (2006.01)
*H04L 12/28* (2006.01)

(52) U.S. Cl. .................. 455/414.1; 455/67.11; 455/517; 455/445; 455/453; 455/466; 370/230.1; 370/236; 370/237

(58) Field of Classification Search .................. 455/405, 455/452, 453, 446, 450, 518, 452.1, 404.1, 455/418, 445, 414.1, 67.11, 424, 517, 466; 370/230.1, 312, 229, 230, 256, 390, 400, 370/235, 236, 237; 379/37
See application file for complete search history.

(56) References Cited

U.S. PATENT DOCUMENTS

| | | | | |
|---|---|---|---|---|
| 5,579,301 A | * | 11/1996 | Ganson | 370/17 |
| 5,583,866 A | * | 12/1996 | Vook et al. | 370/312 |
| 5,764,736 A | * | 6/1998 | Shachar et al. | 379/93.09 |
| 5,771,231 A | * | 6/1998 | Watanabe | 370/377 |
| 5,914,958 A | * | 6/1999 | Chinitz et al. | 370/441 |
| 5,950,136 A | * | 9/1999 | Scott | 455/452.1 |
| 6,115,749 A | * | 9/2000 | Golestani et al. | 709/235 |
| 6,122,518 A | * | 9/2000 | Suda | 455/450 |
| 6,151,633 A | * | 11/2000 | Hurst et al. | 709/235 |
| 6,167,248 A | * | 12/2000 | Hamalainen | 455/403 |
| 6,175,554 B1 | * | 1/2001 | Jang et al. | 370/229 |
| 6,253,087 B1 | * | 6/2001 | Corbett | 455/450 |
| 6,307,861 B1 | * | 10/2001 | Hogg et al. | 370/432 |
| 6,308,071 B1 | * | 10/2001 | Kalev | 455/446 |
| 6,360,076 B1 | * | 3/2002 | Segura | 455/67.1 |
| 6,434,380 B1 | * | 8/2002 | Andersson et al. | 455/406 |
| 6,434,392 B1 | * | 8/2002 | Posti | 455/452 |
| 6,446,108 B1 | * | 9/2002 | Rosenberg et al. | 709/203 |
| 6,456,633 B1 | * | 9/2002 | Chen | 370/490 |
| 6,505,046 B1 | * | 1/2003 | Baker | 455/456.3 |
| 6,556,544 B1 | * | 4/2003 | Lee | 370/256 |
| 6,563,827 B1 | * | 5/2003 | Brueckheimer et al. | 370/395.1 |
| 6,594,703 B1 | * | 7/2003 | Li | 709/235 |
| 6,650,619 B1 | * | 11/2003 | Schuster et al. | 370/230 |
| 6,754,224 B1 | * | 6/2004 | Murphy | 370/432 |
| 6,792,273 B1 | * | 9/2004 | Tellinger et al. | 455/442 |

OTHER PUBLICATIONS

D. Katz, "IP Router Alert Option," IETF Network Working Group, Request for Comments: 2113, Feb. 1997, 4 pages.

* cited by examiner

*Primary Examiner*—George Eng
*Assistant Examiner*—Brandon J Miller

(57) ABSTRACT

In a system and method for providing data application-triggered call volume management, data application content is multicast to a plurality of wireless terminals, the data application content containing a voice call origination invitation. A high voice traffic warning is generated in response to the multicasting event, and resources are allocated for handling increased voice traffic in response to the high voice traffic warning.

22 Claims, 2 Drawing Sheets

DATA APPLICATION-TRIGGERED CALL VOLUME MANAGEMENT

CROSS-REFERENCE TO RELATED APPLICATIONS

This application is related to, and claims benefit of, the filing date of, Provisional Application Ser. No. 60/163,553, entitled "Data Application-Triggered Call Volume Management," filed on Nov. 4, 1999.

STATEMENT REGARDING FEDERALLY SPONSORED RESEARCH OR DEVELOPMENT

Not Applicable

BACKGROUND OF THE INVENTION

1. Field of the Invention

This invention relates to wireless telecommunication systems. More particularly, the invention concerns the management of resources used to provide voice communication service to wireless terminals in a wireless telecommunication system.

2. Description of the Prior Art

In wireless telecommunication systems, a new class of wireless terminal has emerged that is capable of both voice and data communication. These devices typically include an integrated wireless telephone and a software-controlled data terminal that implements a micro-browser for "web surfing" and other data communication activities. In a public data network, such as the Internet, it is not uncommon for commercial entities to include advertising content, mass notifications, and public service messages in web page documents sent to client browsers. This includes documents sent to micro-browser equipped wireless terminals. Indeed, with their integrated telephony equipment, wireless terminals are often the target of messages that invite users to initiate a voice call in order to purchase a product or service, or to obtain information. When such content is sent out as multicast messages, as is often the case, the flood of responses from multiple listening wireless terminals can easily overburden the serving telephone voice network.

It would be advantageous to provide effective measures for managing voice network resources in response to data application content being multicast to a plurality of integrated voice/data wireless terminals. For example, if the voice network was aware of the multicast event, it could presumably take responsive action to handle the anticipated call volume. What is required, therefore, is a system and method that provides such cooperation between voice and data network resources.

SUMMARY OF THE INVENTION

The foregoing problems are solved and an advance in the art is obtained by a novel system and method for providing data application-triggered call volume management. In accordance with the invention, when data application content containing a voice call origination invitation is multicast to a plurality of wireless terminals, a high voice traffic warning is generated and resources are allocated for handling the expected increased voice traffic.

In preferred embodiments of the invention, the data application content is multicast from a data network wireless telephony application server through a data network telephony gateway to the wireless terminals. The wireless telephony server typically receives the data application content from a data application content host prior to the multicast. Along with the data application content, the data application content host provides location information corresponding to a target multicast area. When the wireless telephony application server multicasts the data application content, it also generates the high voice traffic warning and sends it to a voice network operations maintenance resource. The location information initially received from the data application content server is also sent with the high voice traffic warning to the operations maintenance resource. When the high voice traffic warning and location information are received by the operations maintenance resource, it identifies mobile switching center and base station resources corresponding to the location information, sends a high voice traffic warning to these resources advising of the impending voice traffic increase. The mobile switching center and base station resources may then take appropriate responsive actions. Preferably, they impose limits on the number of voice circuits that are allocated to the called number specified in the call originations. This number can be provided to the mobile switching center and base station resources in the high voice traffic warning sent from the operations maintenance resource. In addition, the mobile switching center and base station resources may need to allocate additional out-of-band message processing resources, if available, to accommodate the increased voice traffic.

In another aspect of the invention, a wireless telephony application server is disclosed for providing data application-triggered call volume management. The server receives data application content and location information from a data application content host. It multicasts the data application content to multiple wireless terminals that are within an area corresponding to the location information, and sends a high voice traffic warning to a voice network resource advising that the data application content has been multicast. The warning includes the location information.

In yet another aspect of the invention, a voice network operations maintenance center is disclosed for providing data application-triggered call volume management. The center receives a high voice traffic warning from a data network host. This warning includes location information corresponding to a target area into which a data network host has multicast data application content containing a voice call origination invitation. Using the location information, the center identifies mobile switching center and base station resources that serve wireless terminals that are in the target area. The center then requests the mobile switching center and base station resources to handle increased voice traffic in response to the warning.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
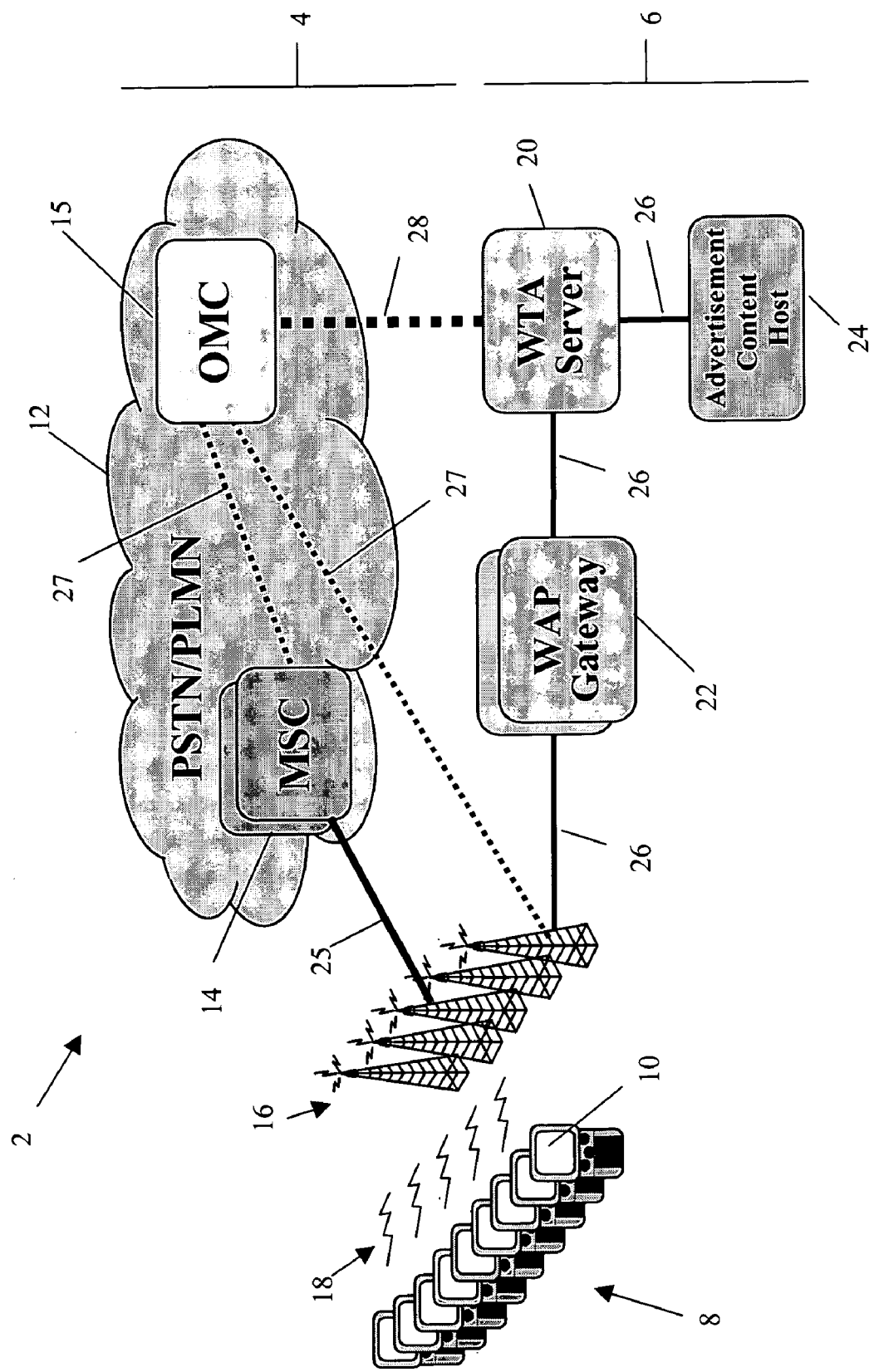
FIG. 1 is a functional block diagram showing a network architecture for a wireless telecommunication system that provides data application-triggered call volume management in accordance with the invention.

Turning now to the figures, wherein like reference numerals represent like elements in all of the several views, FIG. 1 illustrates a network architecture for a wireless telecommunication system 2 that provides data application-triggered call volume management in accordance with the present invention. As shown, the telecommunication system 2 includes voice network resources 4 and data network resources 6. The voice network resources 4 may be implemented in a conventional telephone network that includes wireless access capability, while the data network resources 6 may be implemented in a conventional packet data network implementing the IP (Internet Protocol) network layer protocol and/or the ATM (Asynchronous Transfer Mode) link layer protocol, and which also has wireless access capability. Alternatively, the voice and data network resources 4 and 6 could be implemented as part of an integrated communication network having features found in both conventional telephone and packet data networks.

In the architecture of FIG. 1, there are multiple wireless terminals 8 that are assumed to be powered up in a fully operational mode. Each wireless terminal 8 comprises an integrated wireless telephone and software-controlled data terminal, which preferably implements a WAP (Wireless Application Protocol) micro-browser, or the like, to display WML (WAP Markup Language) documents, or the like, on a display 10. There are a variety of such products on the market today, and others in development.

The voice network resources 4 used to set up voice calls on behalf of the wireless terminals 8 include a PSTN/PLMN (Public Switched Telephone Network/Public Land-based Mobile Network) 12, plural Mobile Switching Centers (MSCs) 14, and a plurality of cell base stations 16 containing radio transceivers. In addition, there is an Operations Maintenance Center (OMC) 15 that oversees and manages certain operations, such as voice traffic load handling, of the MSCs 14 and the base stations 16. Except to the extent that their software programming is modified to perform the functions of the invention, as described in more detail below, each of the foregoing voice network resources 4 is well known in the art.

The air interface pathways for voice communication are shown in FIG. 1 by reference numeral 18. It will be appreciated that communication of voice traffic across this air interface may be implemented using any $2^{nd}$ Generation or $3^{rd}$ Generation wireless voice communication technologies, including IS-54-B (D-AMPS), IS-136, PCS-1900, DCS 1800 (GSM 1800) GSM 900, IS-95, W-CDMA, GPRS, UMTS, IMT2000, and Mobile IP.

The data network resources 6 of FIG. 1 include a data network server and plural data network gateways. More particularly, the data network server is preferably a WTA (Wireless Telephony Application) Server 20 implemented in accordance with the Wireless Application Protocol, and the data network gateways are preferably WAP Gateways (also known as PUSH Proxies) 22. By way of example only, there is also an Advertisement Content Host 24 that maintains advertising material, such as simple banner advertisements and the like, in electronic form. Except to the extent that their software programming is modified to perform the functions of the invention, as described in more detail below, each of the foregoing data network resources is well known in the art.

The air interface pathways for data communication are preferably the same as for voice communication, i.e., the same base stations 16 are used to communicate with the wireless terminals 8 for both data and voice. The communication of data traffic across this air interface may be implemented in accordance with any suitable wireless data communication protocol.

In FIG. 1, the wide solid-line resource interconnection 25 represents a voice pathway. The narrow solid-line resource interconnections 26 represent data pathways. The small dashed-line resource interconnections 27 represent resource management control pathways between the OMC 15 and the MSCs 14 and the base stations 16. The large dashed-line resource interconnection 28 represents a control message (e.g., signaling) pathway between the OMC 15 and the WTA Server 20.

Figure 2:
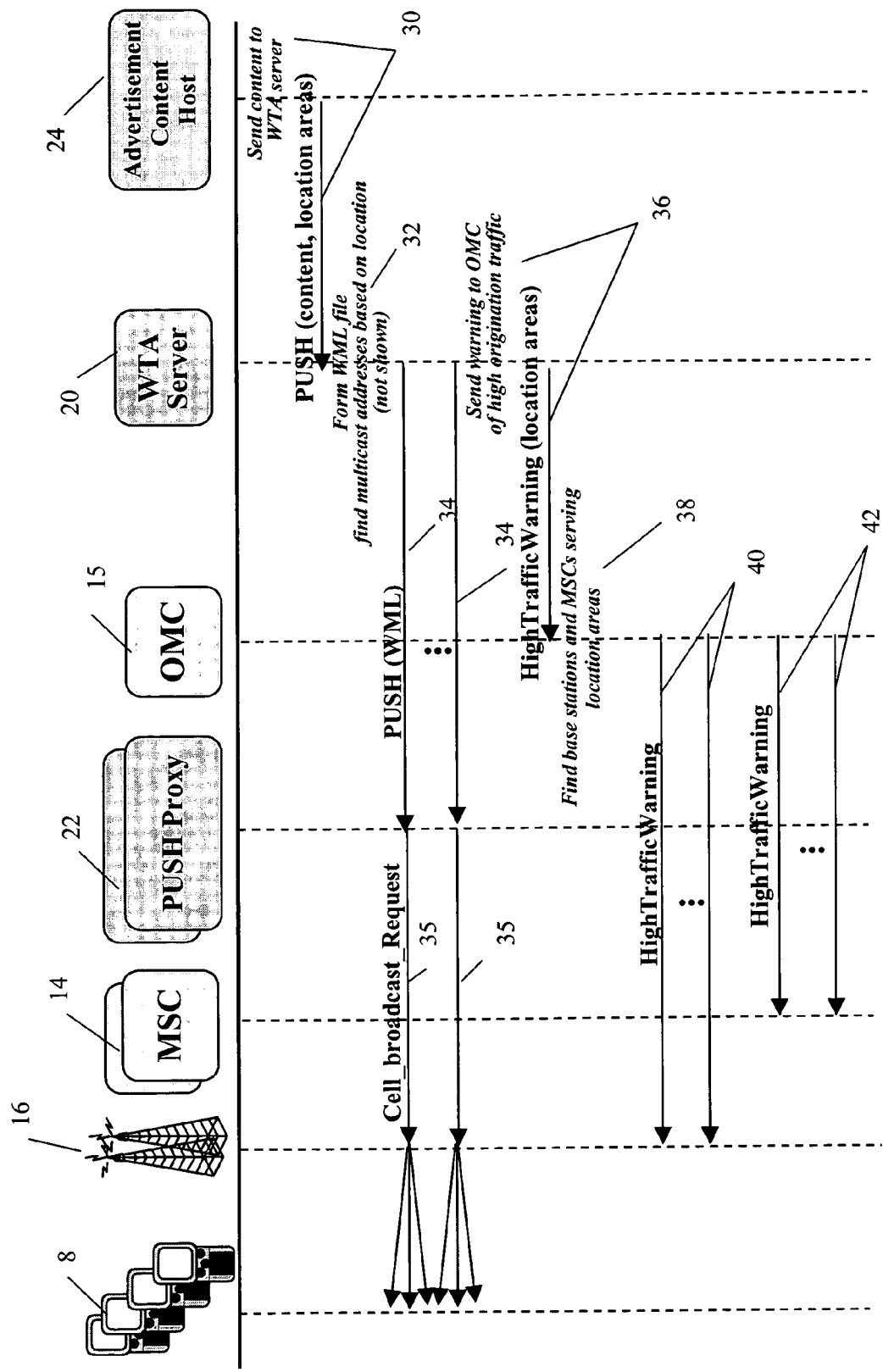
FIG. 2 is a flow diagram showing a series of method steps performed to implement data application-triggered call volume management in accordance with the invention.

Referring now to FIG. 2, the processing steps performed to provide data application-triggered call volume management are shown. It should noted that steps 30-34 below are conventional in nature, whereas steps 36-42 represent novel steps performed in accordance with the present invention.

Initially, in step 30, the Advertisement Content Host 24, which could be co-located with the WTA server 26, but will normally be separately owned, sends data application content, such as advertising, to the WTA server 26. The data application content is assumed to include an invitation to originate a voice call from a wireless terminal at which the data application content is received. More particularly, the invitation may urge that a call be originated immediately upon receipt of the data application content, or within some limited time period thereafter. An example of this would be a "limited time only" promotional offer. A called party telephone number is also specified in the call origination invitation.

Along with the data application content, the Advertisement Content Host 24 provides location information corresponding to one or more areas that have been targeted for multicasting of the data application content. The location information can be provided in a variety of forms. For example, it could be information that identifies a specific PLMN network or a subnetwork thereof, such as the MSCs 14 and the base stations 16. Alternatively, geographical coordinates could be provided along with a distance range, e.g. a radius, from the coordinate location.

The WTA Server 26 is conventionally programmed, as shown in step 32, to form a document, such as a WML document, that contains the data application content. Also in step 32, the WTA Server 26 finds (e.g. performs a database lookup) a data network multicast address that is assigned to target area(s) defined by the location information received from the Advertisement Content Host 24.

In step 34, the WTA Server 20 conventionally multicasts the WML document containing the data application content by sending it to the PUSH Proxies 22. Because it is assumed for purposes of the present discussion that the WAP protocol is in use, step 34 is shown as being implemented using a conventional WAP transfer operation known as a PUSH. The PUSH Proxies 22 are programmed to receive the data application content-containing WML document from the WTA Server 20. If necessary (i.e., if the document is in a format other than WML, such as HTML), the PUSH Proxies can adapt the document based on the WAE (Wireless Application Environment) specifications, or the like, to facilitate display at the wireless terminals 8. The PUSH Proxies may maintain databases that allow the identities of the base stations 16 which are to receive the data application content-containing document to be determined from the multicast address. In step 35, according to their programming, the PUSH Proxies 22 send copies of the document to the base stations 16 for transmission to the wireless terminals 8.

In step 36, the WTA Server 20, according to new programming in accordance with the invention, generates and sends a high voice traffic warning, e.g., as a signaling message, to the OMC 15. This warning includes the location information initially provided by Advertisement Content Host 24 and the associated called number.

In step 38, the OMC 15 uses the location information provided by the WTA Server 20 to identify the MSC's 14 and base stations 16 that serve the targeted wireless terminals 8. As persons skilled in the voice telecommunications network art will appreciate, this information would conventionally be provisioned by the OMC in a database (not shown) that is associated therewith. In steps 40 and 42, the OMC 15 respectively sends the base stations 16 and the MSC(s) 14 a high voice traffic warning. This warning is sent via the usual message exchange mechanisms used by the OMC 15 to manage the MSCs 14 and the base stations 16. It preferably includes the called number specified in the call origination invitation sent to the wireless terminals 8. In response to this warning, the MSCs 14 and the base stations 16 can place limits on the number of voice circuits that are allocated to this number, such that a reasonable supply of voice circuits remain available for calls to and from other numbers. In addition, the OMC 15 may need to request the MSCs 14 and the base stations 16 to allocate additional out-of-band message processing resources, if such are available, to accommodate the impending voice call traffic increase. Note that the foregoing control mechanisms are conventionally implemented in existing mobile switching center and base station equipment and thus may be used in accordance with the invention with little modification being required.

Accordingly, novel system and method for providing data application-triggered call volume management are disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a wireless telecommunication network, a method for providing data application-triggered call volume management, comprising the steps of:
   multicasting data application content to a plurality of wireless terminals, said data application content containing a voice call origination invitation;
   generating a high voice traffic warning in response to said multicasting step, said high voice traffic warning including locating information for locating said wireless terminals; and
   allocating resources for handling increased voice traffic in response to said high voice traffic warning.

2. A method in accordance with claim 1 wherein said multicasting step includes delivering said data application content from a data network wireless telephony application server through a data network telephony gateway to said wireless terminals.

3. A method in accordance with claim 2 further including providing said data application content to said wireless telephony application server from a data application content host prior to said multicasting step.

4. A method in accordance with claim 3 wherein said providing step further includes providing said location information to said wireless telephony application server from said data application content host.

5. A method in accordance with claim 4 wherein said generating step includes said wireless telephony application server generating said high voice traffic warning and sending it to a voice network operations maintenance resource along with said location information.

6. A method in accordance with claim 5 wherein said allocating step includes said operations maintenance resource notifying mobile switching center and base station resources in said wireless telecommunication network.

7. A method in accordance with claim 6 wherein said allocating step further includes said operations maintenance resource using said location information to identify said mobile switching center and base station resources.

8. A method in accordance with claim 7 wherein said base station resources are base stations used during said multicasting step to multicast said data application content to said wireless terminals.

9. A method in accordance with claim 1 wherein said data application content comprises advertising, a mass notification, or a public service message.

10. In a wireless telecommunication system, a system for providing data application-triggered call volume management, comprising:
    means for multicasting data application content to a plurality of wireless terminals, said data application content containing a voice call origination invitation;
    means for generating a high voice traffic warning in response to said multicasting step, said high voice traffic warning including location information for locating said wireless terminals; and
    means for allocating resources for handling increased voice traffic in response to said high voice traffic warning.

11. A system in accordance with claim 10 wherein said multicasting means includes a data network wireless telephony application server and a data network telephony gateway adapted to deliver said data application content to said wireless terminals.

12. A system in accordance with claim 11 further including a data application content server adapted to provide said data application content to said wireless telephony application host prior to said multicasting step.

13. A system in accordance with claim 12 wherein said data application content server is adapted to provide said location information to said wireless telephony application server from said data application content host.

14. A system in accordance with claim 13 wherein said wireless telephony application server is adapted to generate said high voice traffic warning and send it to a voice network operations maintenance resource along with said location information.

15. A system in accordance with claim 14 wherein said allocating means includes means in said operations maintenance resource for notifying mobile switching center and base station resources in said wireless telecommunication network.

16. A system in accordance with claim 15 wherein said allocating means further includes means in said operations maintenance resource for using said information to identify said mobile switching center and base station resources.

17. A system in accordance with claim 16 wherein said base station resources are base stations comprising part of said multicasting means for multicasting said data application content to said wireless terminals.

18. A system in accordance with claim 10 wherein said data application content is advertising content, a mass notification, or a public service message.

19. A voice network resource group for providing data application-triggered call volume management in a voice network in cooperation with a data network resource group in a data network, comprising:
   a set of manageable voice network resources supporting voice call origination on behalf of a plurality of wireless terminals over an air interface;
   a voice network operations maintenance resource adapted to manage said manageable voice network resources; and
   first means in said voice network operations maintenance resource for receiving a high voice traffic warning from a data network resource, said high voice traffic warning including location information that identifies one or more areas of impending high voice traffic volume;
   second means in said voice network operations maintenance resource for identifying a subset of said set of manageable voice network resources supporting wireless terminals in said one or more areas; and
   third means in said voice network operations maintenance resource for managing said subset of manageable resources to handle said impending high voice traffic volume.

20. A data network resource group for providing data application-triggered call volume management in a data network in cooperation with a voice network resource group in a voice network, comprising:
   a first data network resource adapted to provide data application content and location information to a second data network resource;
   a second data network resource adapted to receive said data application content and said location information;
   first means in said second data network resource for determining a multicast address based on said location information;
   second means in said second data network resource for generating a multicast document containing said application content and for sending said document and said multicast address to a third data network resource;
   third means in said second data network resource for sending a high voice traffic warning containing said location information to a voice network operations maintenance resource;
   said third data network resource adapted to receive said multicast document and said multicast address from said second data network resource; and
   means in said third data network resource for identifying one or more base stations from said multicast address and for sending said multicast document to said base stations for multicasting to wireless terminals corresponding to said location information.

21. In a voice network operations maintenance center, a method for providing data application-triggered call volume management, comprising the steps of:
   receiving a high voice traffic warning from a data network server, said high voice traffic warning including location information corresponding to a plurality of wireless terminals relative to which said data network server has multicast data application content containing a voice call origination invitation;
   identifying mobile switching center and base station resources associated with said location information; and
   managing said mobile switching center and base station resources to handle increased voice traffic volume in response to said high voice traffic warning.

22. A voice network operations maintenance center adapted to provide data application-triggered call volume management, comprising:
   means for receiving a high voice traffic warning from a data network server, said high voice traffic warning including location information corresponding to a plurality of wireless terminals relative to which said data network server has multicast data application content containing a voice call origination invitation;
   means for identifying mobile switching center and base station resources associated with said location information; and
   means for managing said mobile switching center and base station resources to handle increased voice traffic volume in response to said high voice traffic warning.

* * * * *